March 23, 1937. C. S. ASH 2,074,354
TOURING CAR
Filed Aug. 12, 1933 3 Sheets-Sheet 1

INVENTOR
Charles S. Ash,
BY
ATTORNEYS

March 23, 1937.  C. S. ASH  2,074,354
TOURING CAR
Filed Aug. 12, 1933  3 Sheets-Sheet 2

INVENTOR
Charles S. Ash,
BY
ATTORNEYS

March 23, 1937.  C. S. ASH  2,074,354
TOURING CAR
Filed Aug. 12, 1933  3 Sheets-Sheet 3
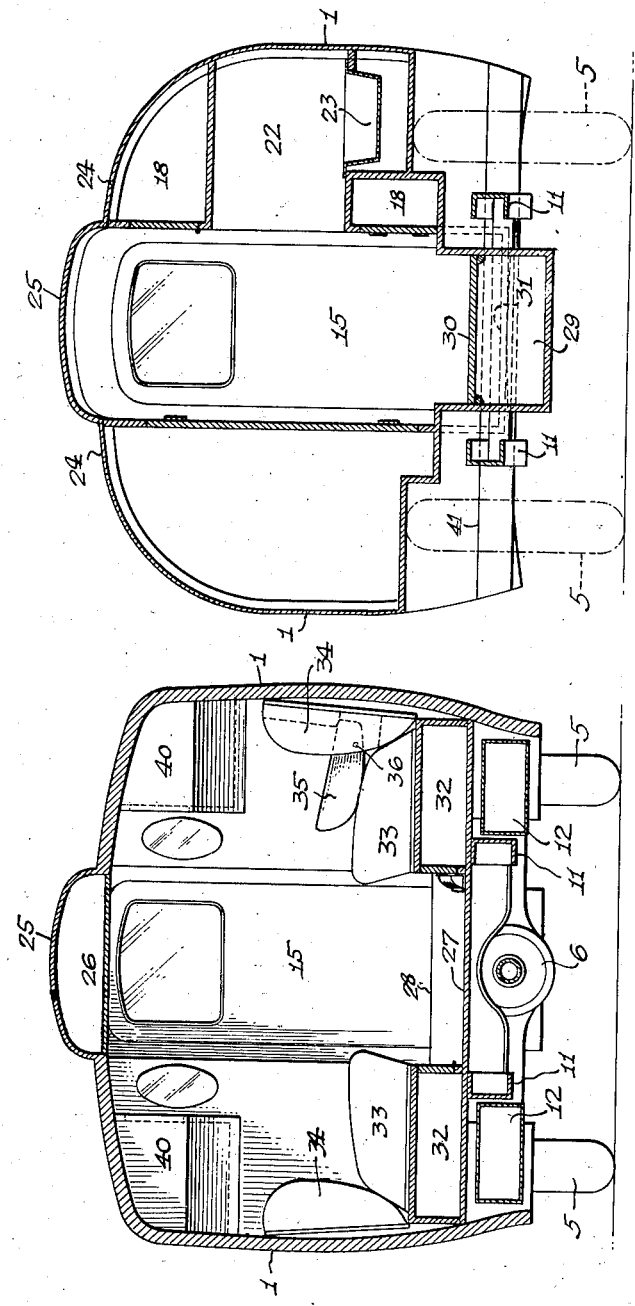
INVENTOR
Charles S. Ash,
BY
ATTORNEYS Patented Mar. 23, 1937

2,074,354

UNITED STATES PATENT OFFICE 2,074,354

TOURING CAR

Charles S. Ash, Birmingham, Mich.

Application August 12, 1933, Serial No. 684,804

1 Claim. (Cl. 296—23)

This invention relates to touring cars and more particularly to a body therefor especially adapted for use as living quarters upon long trips.

An object of the invention is to provide a body adaptable to the ordinary car chassis, wherein the construction is such as to provide a maximum interior space by stream-lining the side walls outwardly to occupy the space usually taken up exteriorly of the body, by the rear part of the running boards and rear wheel fenders, and by extending and stream-lining the rear end of the body.

A further object is to provide an interior arrangement whereby maximum seating and storage capacity is secured and the seating space is made adaptable for use as sleeping quarters and whereby a kitchenette is provided together with cupboard and other storage facilities and ample head room afforded.

It is also an object to provide an interior arrangement affording easy and convenient exit and entrance facilities, and to provide a very rigid chassis extension to support the overhang of the rear end of the body and to provide a place of attachment for towing or other similar means. A further object is to provide certain other new and useful features in the construction, arrangement and combination of elements, all as hereinafter set forth and more particularly pointed out, reference being had to the accompanying drawings in which:

Fig. 3 is a transverse section substantially upon the line 3—3 of Fig. 3; and

Fig. 4 is a similar section substantially upon the line 4—4 of Fig. 2.

Figure 1:
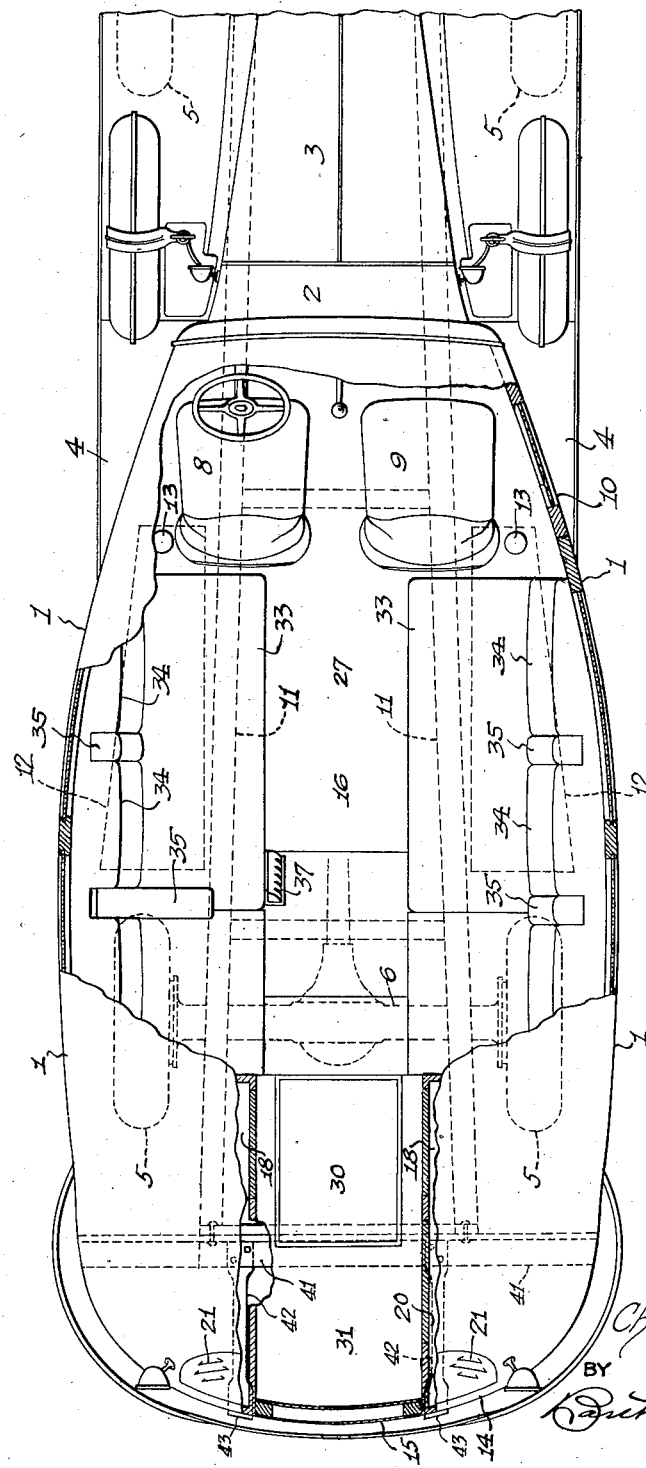
Figure 1 is a plan view of a motor car illustrative of my embodiment of the present invention and showing the same broken away and partly in section to show the interior construction.
Figure 2:
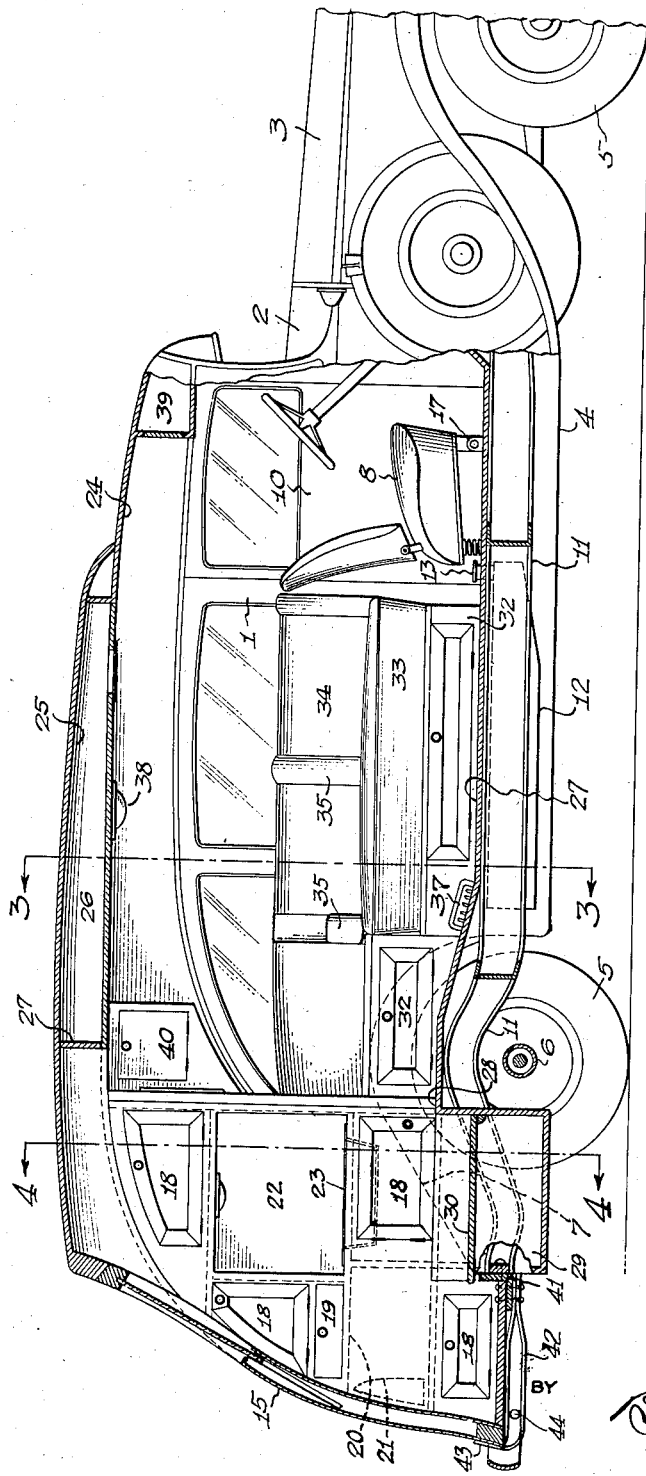
Fig. 2 is a central, longitudinal section.

Motor car bodies as commonly constructed, are of limited width, being usually confined substantially between the vertical planes of the inner sides of the ground wheels with running boards extending along the side walls of the body to meet the forward ends of the mud guards or fenders projecting from said sides over the rear wheels.

In the present construction, the side walls 1 of the body are stream lined or curved outwardly and rearwardly from the cowl 2 at the rear of the hood 3, covering a large portion of the running boards 4 and housing the rear wheels 5 on the rear axle 6, within side recesses 7 in the body. This gives maximum width of body rearwardly of the usual driver's seat 8 and companion seat 9, and leaves the forward ends of the running boards exposed to serve as steps to the front doors 10 in the side walls 1 directly opposite and close to these seats. This projection of the body side walls outwardly to or beyond the normal position of the usual running boards, obviates the necessity for extending the running boards rearwardly beyond the doors 10, and thus considerable space is provided at each side of the chassis frame 11 between said sides and the lower edges of the side walls of the body, within which spaces suitable tanks 12 may be located, one for gasoline and the other for water; and as the forward ends of these tanks are located adjacent the doors 10, filler pipes may be extended from said ends, through the body floor and each provided with a cap 13 inside the body, to which filler pipes ready access may be had to fill the tanks, by opening said doors.

The rear end of the body is extended some distance beyond the rear axle 6 and stream lined or rounded and curved rearwardly and downwardly from substantially the vertical plane of said axle, and in the rear wall 14 of this end is a central doorway which is closed by a door 15. This doorway opens into the rear end of a central longitudinal aisle 16 extending forwardly to the rear of the seats 8 and 9, and therefore ready entrance and exit to this aisle is provided by the rear door 15 and by the front doors 10, said seats being pivoted to the floor as at 17 so that they may be readily tilted forwardly to give free access to this aisle.

The space at each side of the rear end of the aisle up to a point just rearwardly of the axle 6, is filled with suitable storage and other compartments, such as suitable cupboards closed by doors 18 and drawers 19, and by chambers 20, one at each side, provided with an outside door 21 in the wall 14, which chambers are especially designed to serve as dog kennels for housing hunting dogs to be taken along when making hunting trips. One of the compartments 22 at one side of the aisle is open and forms a kitchenette, it being provided with a hot plate or gas stove 23 with other cooking facilities.

The roof 24 of the body is formed with a central, longitudinally extending raised portion 25, of a width substantially equal to that of the aisle 16 and the forward part of which is designed as a storage space for a bed, bedding and the like, this space 26 having a rear end door 27, the rear end part of this raised part being open at the bottom to provide greater head room at the rear end of said aisle, this raised portion being extended to nearly the vertical plane of the extreme rear end of the body to also provide head room for the doorway in said end. Because of the rear axle housing which extends transversely beneath the floor 27 of the aisle 16, this floor 27 is raised somewhat where it passes over said axle and ends in a step 28 just rearwardly of the axle, this step being located adjacent the kitchenette 22, and to provide further head room so that a person may stand erect while preparing a meal, just rearwardly of the step 28, the floor of the aisle is formed with a well 29 which is provided with a removable cover 30 forming a second or intermediate step between the step 28 and the aisle floor 31 directly opposite the rear entrance door 15, so that when this cover 30 is in place it forms a step leading to the rear end of the aisle floor 27 which is elevated to give clearance for the rear axle housing, and which cover may be removed or turned out of the way so that a person may stand in the well 29 while working at the stove in the kitchenette. The floor 31 at the rear end of the aisle is considerably lower than the floor 27 of the forward part, so that persons entering through the rear doorway, may conveniently step directly from the ground into the rear end of the aisle. The position of this well 29 is also such that the stove and accessories are not only in easy reach of the person preparing a meal, but also all cupboard and other storage spaces.

In the side walls 1 of the body, suitable windows are provided, these being suitably shaped to give an attractive appearance to the body, and along these walls beneath these windows, are box seats 32 upon which are placed cushions 33, and secured to the walls 1 are back cushions 34 which are recessed at suitable intervals to receive seat arms 35 which arms are each pivoted adjacent their lower ends, as at 36, to swing down out of said recesses and rest upon the cushions 33, thus dividing the length of each cushion into a plurality of individual seats. The passengers are thus seated along each side of the aisle, those at one side, facing those at the other, so that by placing a foldable table within the aisle, meals may be conveniently served, the rear end of the table being within convenient reach of the person preparing the meal and standing within the well 29. It is however obvious that individual swivel chairs may be positioned along the side walls instead of these fixed seats, if so desired but comfortable riding is secured by the present arrangement, due to the dividing of these seats by the foldable arms 35 which may be folded up into their recesses in the back cushions so that the long seat cushions extending along each side wall of the body may serve as spring supports for a bed placed thereon and spanning the aisle, thus providing comfortable sleeping quarters for a number of persons, the forward ends of these long seats being positioned adjacent the seats 8 and 9 which may be folded forwardly out of the way.

The body is provided with all accessories necessary for comfort as living quarters upon long journeys, a heater being indicated at 37, a dome light 38 arranged on the roof midway of the length of the aisle 16, and cupboards 39 and 40 above the windshield and in the meeting corners of the walls 1 with the forward end walls of the compartments at the sides of the rear end portion of said aisle, these cupboards serving as convenient places of deposit for hats, wraps, etc. All available space within the body is thus utilized and a very compact and convenient arrangement secured.

Due to the extreme overhang of the body rearwardly of the rear axle, it is necessary to provide a very strong, rigid support, for this rear overhanging end, and for this purpose a heavy transverse angle bar 41 is rigidly bolted or otherwise secured to the extreme rear ends of the side members 11 of the chassis frame, and longitudinal channel bars 42 are secured at their forward ends to the horizontal flange of the bar 41 to extend rearwardly therefrom to the extreme rear end of the body where they are upturned as at 43, and secured to the body, thus providing a very rigid support for the body, and openings 44 may be provided in said bars 42 near their rear ends so that ropes, chains or other means may be conveniently made fast thereto for the purpose of towing another vehicle or for pulling the car rearwardly should it be desirable to do so. These bars 42 are preferably so positioned that they may also serve as skids should the rear end of the body come in contact with the ground, their lower flat sides projecting below the body end and thus they protect said rear end.

Obviously changes may be made in the construction and arrangement, within the scope of the appended claim, without departing from the spirit of the invention, and such changes are contemplated.

Having thus fully described my invention, what I claim is:—

A touring car including a chassis frame, a body of reduced overall height and dropped rear section mounted upon said frame and formed with a rear entrance and an aisle extending forwardly from said rear entrance in said rear portion of said body, a floor for said aisle having a raised portion extending over said axle and a movable portion forming the movable tread of a step leading to said raised portion, the distance between said movable portion and the roof of said aisle being insufficient for erect posture by an adult occupant, a well beneath the movable portion of said floor and the bottom of which is below the plane of said floor rearwardly of said axle, whereby head room is provided for a person standing in said well.

CHARLES S. ASH.